United States Patent
Jonsson

(10) Patent No.: US 7,651,157 B2
(45) Date of Patent: Jan. 26, 2010

(54) SAFETY DEVICE

(75) Inventor: Tony Jonsson, Riaz (CH)

(73) Assignee: Ford Global Technologies, LLC, Dearborn, MI (US)

( * ) Notice: Subject to any disclaimer, the term of this patent is extended or adjusted under 35 U.S.C. 154(b) by 276 days.

(21) Appl. No.: 11/748,068

(22) Filed: May 14, 2007

(65) Prior Publication Data

US 2007/0267857 A1    Nov. 22, 2007

(30) Foreign Application Priority Data

May 16, 2006   (EP)   ................................. 06113982

(51) Int. Cl.
*B60R 21/045* (2006.01)
(52) U.S. Cl. ................. 296/187.05; 280/752; 296/1.04; 296/37.12
(58) Field of Classification Search ............... 188/371, 188/375, 377; 280/748, 751, 752, 753; 296/1.04, 296/37.12, 70, 187.05, 84.1, 193.02
See application file for complete search history.

(56) References Cited

U.S. PATENT DOCUMENTS

| | | | | |
|---|---|---|---|---|
| 2,287,404 A | * | 6/1942 | Zerk ........................... 62/244 |
| 3,198,288 A | * | 8/1965 | Presunka ..................... 188/377 |
| 3,462,191 A | * | 8/1969 | Erneman et al. ............. 297/472 |
| 3,482,872 A | * | 12/1969 | Chamberlain ................ 297/472 |
| 3,876,228 A | * | 4/1975 | Hawkins et al. ............. 280/752 |
| 3,924,707 A | * | 12/1975 | Renner et al. ................. 180/90 |
| 3,964,578 A | * | 6/1976 | Campbell et al. ........... 188/377 |
| 4,427,215 A | | 1/1984 | Weichenrieder et al. |
| 4,445,720 A | * | 5/1984 | Leaf et al. ................. 296/37.12 |
| 4,646,492 A | * | 3/1987 | Fujikawa ..................... 52/208 |
| 4,869,546 A | * | 9/1989 | Sato ........................... 296/192 |
| 4,893,834 A | * | 1/1990 | Honda et al. ................ 280/751 |

(Continued)

FOREIGN PATENT DOCUMENTS

DE    3843079 A1 *   7/1990

(Continued)

OTHER PUBLICATIONS

KR 2005 008099 A; Jan. 21, 2005; Inventor J W Lee.*

*Primary Examiner*—Glenn Dayoan
*Assistant Examiner*—Paul A Chenevert
(74) *Attorney, Agent, or Firm*—Gregory Brown; Brooks Kushman P.C.

(57) ABSTRACT

A safety device a for a vehicle including a load distributing member for arrangement in front of a vehicle seat so as to be exposed to an impact load from a vehicle occupant as the occupant moves forwardly in an impact situation, and a load deformable member arranged to retard the forward movement of the occupant, wherein the load deformable member is intended to be attached to the load distributing member and to a supporting member, which supporting member is intended to hold at least a part of the load deformable member in place in relation to the vehicle, and wherein the load distributing member is sufficiently rigid to allow the impact load to be distributed to the load deformable member. The safety device is characterized in that the load deformable member is intended to be arranged with regard to the load distributing member and the supporting member so as to be deformed by tensile and/or shear forces in the event of an impact situation.

8 Claims, 4 Drawing Sheets

U.S. PATENT DOCUMENTS

| | | | | |
|---|---|---|---|---|
| 4,901,592 | A * | 2/1990 | Ito et al. | 74/492 |
| 4,978,136 | A * | 12/1990 | Tomita et al. | 280/751 |
| 5,071,162 | A | 12/1991 | Takagawa | |
| 5,131,286 | A * | 7/1992 | Sturges et al. | 74/492 |
| 5,190,314 | A | 3/1993 | Takasugi | |
| 5,238,286 | A * | 8/1993 | Tanaka et al. | 296/70 |
| 5,387,023 | A * | 2/1995 | Deneau | 296/72 |
| 5,431,442 | A | 7/1995 | Tomita et al. | |
| 5,456,494 | A * | 10/1995 | Witkovsky | 280/752 |
| 5,482,319 | A * | 1/1996 | Yoshimura et al. | 280/752 |
| 5,487,323 | A * | 1/1996 | Madden, Jr. | 89/36.08 |
| 5,577,770 | A * | 11/1996 | Sinner et al. | 280/752 |
| 5,718,453 | A * | 2/1998 | Kassel et al. | 280/752 |
| 6,196,588 | B1 * | 3/2001 | Sugawara | 280/779 |
| 6,299,208 | B1 | 10/2001 | Kasahara et al. | |
| 6,390,503 | B2 * | 5/2002 | Muramatsu et al. | 280/750 |
| 6,394,241 | B1 * | 5/2002 | Desjardins et al. | 188/376 |
| 6,422,633 | B2 * | 7/2002 | Neuss et al. | 296/70 |
| 6,554,352 | B2 * | 4/2003 | Nagy | 296/203.02 |
| 6,837,518 | B2 * | 1/2005 | Mullan | 280/752 |
| 6,877,766 | B2 * | 4/2005 | Mikolajewski | 280/728.2 |
| 6,883,833 | B2 * | 4/2005 | Yamazaki et al. | 280/751 |
| 6,896,308 | B2 * | 5/2005 | Okanda et al. | 296/37.12 |
| 6,913,288 | B2 * | 7/2005 | Schulz et al. | 280/805 |
| 6,948,738 | B2 | 9/2005 | Garnweidner et al. | |
| 7,125,045 | B2 * | 10/2006 | Fuks et al. | 280/748 |
| 7,210,704 | B2 * | 5/2007 | Ko | 280/748 |
| 7,311,327 | B2 * | 12/2007 | Yamazaki | 280/752 |
| 7,311,328 | B2 * | 12/2007 | Best et al. | 280/752 |
| 7,354,065 | B2 * | 4/2008 | Muramatsu et al. | 280/752 |
| 2002/0190514 | A1 * | 12/2002 | Mueller | 280/753 |
| 2004/0124623 | A1 | 7/2004 | Yamazaki | |
| 2004/0251670 | A1 | 12/2004 | Wang et al. | |
| 2005/0029792 | A1 * | 2/2005 | Muller | 280/753 |
| 2005/0242562 | A1 * | 11/2005 | Ridgway et al. | 280/777 |
| 2006/0038389 | A1 | 2/2006 | Ko | |
| 2007/0222197 | A1 * | 9/2007 | Makita et al. | 280/752 |
| 2008/0007039 | A1 * | 1/2008 | Iwasaki et al. | 280/752 |
| 2008/0093831 | A1 * | 4/2008 | Ellison | 280/752 |

FOREIGN PATENT DOCUMENTS

| | | | |
|---|---|---|---|
| DE | 19853346 | | 5/2000 |
| EP | 294128 | A2 * | 12/1988 |
| FR | 2639291 | A1 * | 5/1990 |
| JP | 05213128 | A * | 8/1993 |
| JP | 06080056 | A * | 3/1994 |
| JP | 06087391 | A * | 3/1994 |
| JP | 06234343 | A * | 8/1994 |

* cited by examiner

SAFETY DEVICE

TECHNICAL FIELD

This invention relates to a safety device for a vehicle.

BACKGROUND ART

In order to protect the occupants of a vehicle in case of an accident, such as a frontal impact between two cars, vehicles are normally equipped with an interior safety system including safety belts, airbags and devices for protecting or restraining the movement of e.g. the knees or legs of occupants. With regard to the front-row passenger seat a glove box is normally placed in front of the knees of an occupant sitting in this seat. Knee safety devices are therefore commonly combined with the glove box.

Various knee safety devices have been disclosed in the past. US 2004/0124623 discloses a device comprising a glove box mounted via support members to a cross member located behind the dashboard. The glove box is provided with grooves arranged such that the glove box can collapse, or its side walls deform by bending, and thereby absorb impact energy if the knees of the occupant hit the glove box.

U.S. Pat. No. 4,427,215 discloses a device where a deformable restraining member is positioned in the lid of the glove box as to absorb the impact energy.

U.S. Pat. No. 5,071,162 discloses a device having a shock absorbing member in the form of a plate made of overlapping steel sheets arranged in the lid of the glove box. In the event of a knee impact on the glove box, the shock absorbing member absorbs impact energy by plastic deformation.

U.S. Pat. No. 5,190,314 discloses a glove box structure wherein two resiliently bending metal plates are mounted to a crossbar extending in the vehicle's rear direction with the glove box secured on the underside of the plates. In the event of an impact on the glove box the metal plates absorb energy by bending.

U.S. Pat. No. 5,431,442 discloses a structure where a weaker intermediate wall of the glove box is compressed, deformed and broken, thereby absorbing crash energy.

U.S. Pat. No. 6,299,208 discloses a system comprising knee guard brackets with U-shaped or C-shaped cross section mounted to a transverse support beam and extending towards the rear of the vehicle. The lid of the glove box is positioned outside the brackets such when the glove box lid is subject to an impact the brackets absorb energy by buckling deformation.

U.S. Pat. No. 6,948,738 discloses a device comprising cuff plates and a load distributor mounted to a supporting tube and positioned in front of the knees of an occupant sitting in the front seat. In the event of a frontal impact the knees of the occupant hit the load distributor and the impact energy is absorbed by rolling deformation of the cuff plates.

Conventional knee safety devices, such as the ones described above, normally work well when the knees of an occupant hit the structure in a way that has been considered in the design of the device. However, if a knee hits the structure in an unexpected way, the function of these devices is uncertain since they are sensitive to different positions or directions of impact.

Another disadvantage of conventional knee safety devices is that it is rather difficult to carry out readjustments of the device which normally is required to consider the large number of parameters affecting the function, such as friction between occupant and seat.

Many conventional devices also suffer from the disadvantage that energy absorbing members are placed at the side of the glove box, which makes it necessary to make the glove box narrower and thus less suitable for storage.

SUMMARY OF INVENTION

The main object of this invention is to provide a safety device, in particular a knee safety device, which exhibits improved safety properties compared to conventional devices.

The invention concerns a safety device for a vehicle, said device comprising a load distributing member for arrangement in front of a vehicle seat so as to be exposed to an impact load from a vehicle occupant as the occupant moves forwardly in an impact situation, and a load deformable member arranged to retard the forward movement of the occupant, wherein the load deformable member is intended to be attached to the load distributing member and to a supporting member, which supporting member is intended to hold at least a part of the load deformable member in place in relation to the vehicle, and wherein the load distributing member is sufficiently rigid to allow the impact load to be distributed to the load deformable member. The invention is characterized in that the load deformable member is intended to be arranged with regard to the load distributing member and the supporting member so as to be deformed by tensile and/or shear forces in the event of an impact situation.

As mentioned above, conventional knee safety devices generally comprise some form of load deformable member positioned between a part of the supporting structure of the vehicle and the knees of an occupant in a front seat such that the member can deform and absorb energy by collapsing, bending, buckling etc. when the knees move in a forward direction in the event of a frontal impact.

In contrast to such devices, the inventive safety device has the advantageous effect that collapsing, bending, buckling etc. of the device is avoided. The inventive safety device instead makes it possible to expose the deformable member to tensile and shear forces as deformation forces. In contrast to collapsing, bending, buckling etc., tensile and shear forces form stable load cases which make it easier to predict the behaviour of the device during impact. In turn, this makes the inventive device less sensitive to different positions or directions of impact. Moreover, the inventive device also reduces and simplifies the work related to readjustments since a structure intended to withstand tensile forces generally is easier to modify. The inventive solution also makes it possible to design a lighter structure because it is possible to load more energy into elements subjected to tensional loads. In addition, vehicle structures that already exist can be used to a greater extent.

In an embodiment of the invention the load deformable member is intended to be attached to the load distributing member at a position that is located closer to a front of the vehicle than the position at which the load deformable member is intended to be attached to the supporting member. This way the device becomes particularly adapted to a frontal impact, i.e. when the occupant moves towards the front of the vehicle in the impact situation. Moreover, this design makes the load case even more stable since it is possible to utilize tensile deformation forces solely.

In a further embodiment of the invention the load deformable member comprises a wave-shaped steel band. A wave-shaped steel band is a reliable and cost-effective construction that is well suited for being exposed to tensile forces. In such a structure impact energy can be absorbed by extending the bands, i.e. by straightening out their wave-shape. As alternative to, or in combination with, wave-shaped steel-bands, the load deformable member can comprise a first part intended to be attached to the supporting member and a second part intended to be attached to the load distributing member, wherein said first and second parts are arranged to be joined together by inserting a pin, positioned on one of the parts, into a hole positioned on the other part. In such a structure impact energy can be absorbed when the pin is forced through the other part.

In another embodiment of the invention the load deformable member is intended to be attached to the load distribution member on a side of the load distributing member that faces away from the seat. Such a design is simple and space-saving.

In yet another embodiment of the invention the safety device is intended to be arranged between said supporting member and an additional supporting member wherein the load deformable member is arranged to be connected to both supporting members so as to extend from one of the supporting members to the other via the load distributing member. This forms a symmetric and stable load case. Preferably, the load deformable member extends from a first position above the load distributing member to a second position below the load distributing member when the device is installed. Thereby, the device does not necessarily have to occupy space at the sides of the load distributing member which is advantageous with regard to the width of the glove box in cases where the glove box forms part of the load distributing member.

BRIEF DESCRIPTION OF DRAWINGS

In the description of the invention given below reference is made to the following figures, in which.

DETAILED DESCRIPTION OF INVENTION

Figure 1:
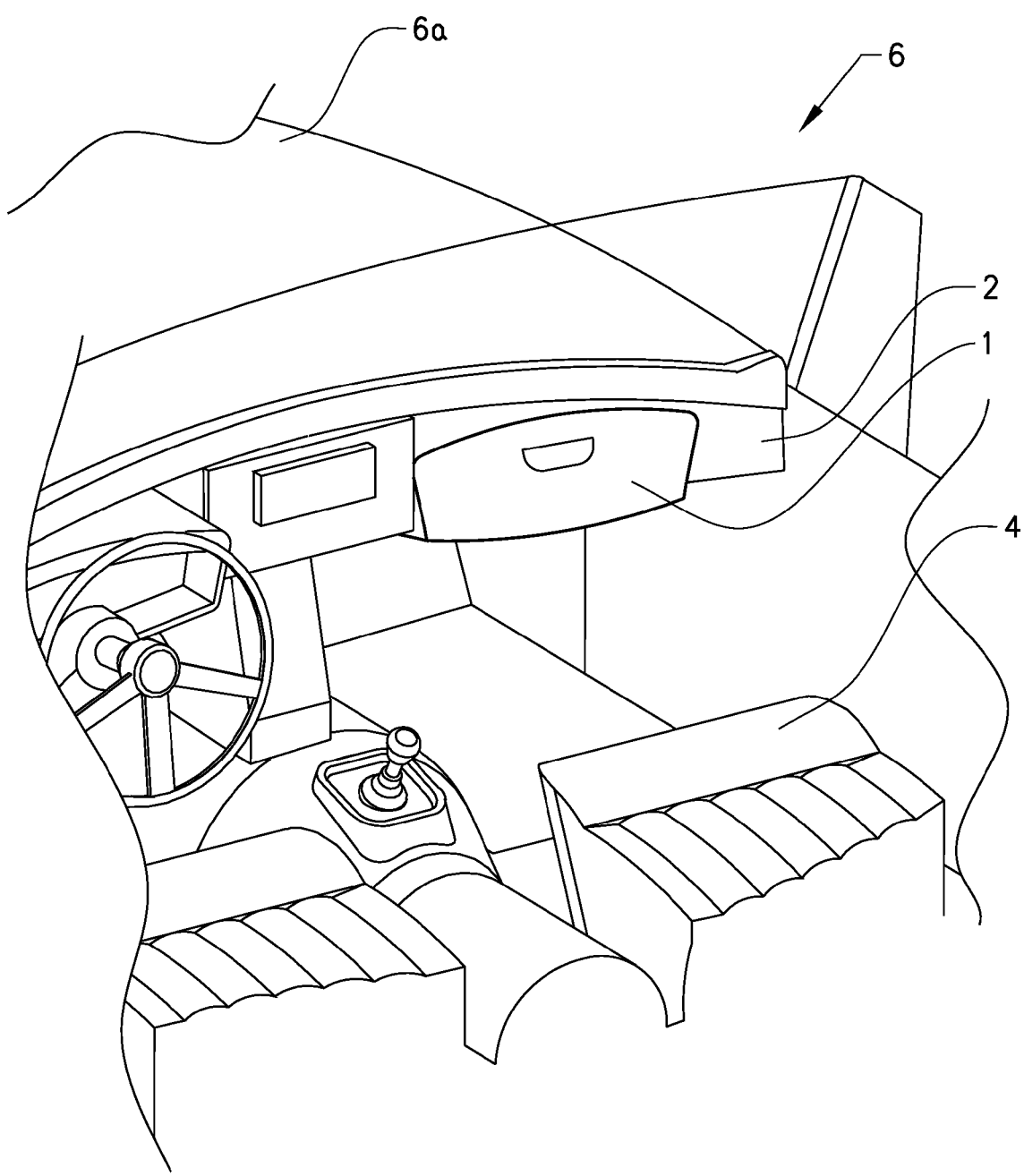
FIG. 1 shows, in a schematic perspective view, a principal example of the positioning of a safety device according to the invention.

FIG. 1 shows, in a schematic perspective view, a preferred example of the positioning of a safety device 1 according to the invention. As shown in FIG. 1, the safety device 1 is positioned in front of a front-row passenger seat 4 in a vehicle 6 at a height approximately corresponding to the knees of an occupant (not shown) sitting in the seat 4. A front of the vehicle 6 is indicated by the reference sign 6a. The safety device 1 is thus intended to be exposed to an impact load from a knee or leg of a vehicle occupant as the occupant moves relative to the device in an impact situation. In this example, the safety device 1 forms a lower part of a dashboard 2 in the form of a glove box.

Figure 2:
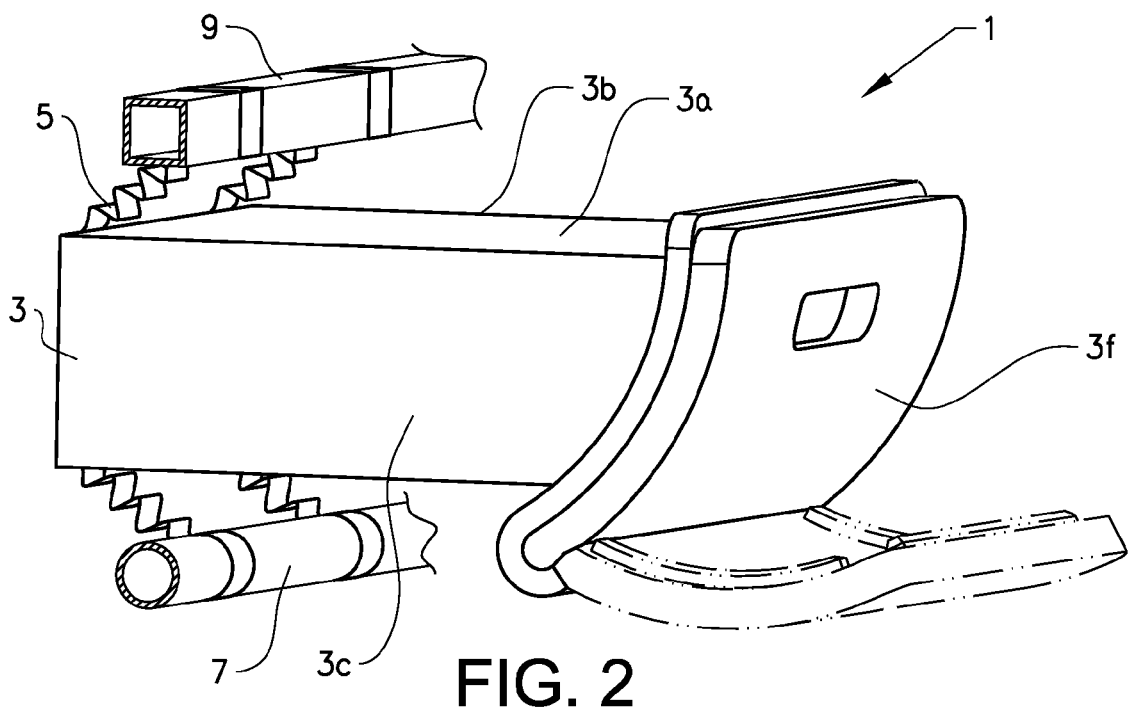
FIG. 2 shows, in a perspective view, a first preferred embodiment of a safety system according to the invention.

FIG. 2 shows, in a perspective view, a first preferred embodiment of a safety device 1 according to the invention. A load distributing member in the form of a glove box 3 is arranged between a first and a second supporting member 7, 9 in the form of cross bars extending transversely below and above, respectively, the load distributing member 3 between two front pillars (not shown) of the vehicle 6. The load distributing member 3 comprises an upper wall 3a, two side walls 3b, 3c, a back side 3d (see FIG. 4) facing towards the front 6a of the vehicle 6, an under side 3e (see FIG. 4) and a front side, facing the seat 4, in the form of a glove box lid 3f. An open position of the lid 3f is indicated by dashed lines. The device 1 further comprises two load deformable members 5 in the form of wave-shaped steel bands, each of which is firmly connected to the first and second supporting members 7, 9. Each steel band 5 is also firmly attached to the back side 3d of the load distributing member 3 by means of pressing forces generated by a suitable tightening of the bands 5.

In addition to what is shown in the figures, some form of securing arrangement is needed to keep the load distributing member 3, i.e. in this example the glove box, in place in normal, non-impact situations. Various securing arrangements known to a person skilled in the art could be used for this purpose. To be capable of distributing an impact load, the load distributing member 3 must be fastened in such a way that it is allowed to move in an impact situation. In the example shown here the load distributing member 3 must be allowed to move in a frontal direction, e.g. towards the front 6a of the vehicle 6, when exposed to an impact load from a knee or leg of a vehicle occupant in an impact situation. The means used for securing the load distributing member 3 should therefore be designed to break when subjected to a certain load, or should be resilient in a certain direction; in this case in a direction towards the front 6a of the vehicle 6. In the example shown here, the load distributing member 3 can be secured to the first and/or second supporting member 7, 9. Alternatively, the load distributing member 3 can be secured to e.g. a further supporting member or to the dashboard 2.

In the example shown, the steel bands 5 are attached to the supporting member 7, 9 by letting the end part of the band 5 form a loop around the supporting member 7, 9 which loop is secured by a screw joint (not shown). Alternatively, the band 5 could be attached directly to the supporting member 7, 9 using e.g. a screw joint. By providing the supporting member 7, 9 with slots adapted to receive the bands 5, the band 5 can be attached to the inside of the supporting member 7, 9. In general, the attachment of the load deformable member 5 to the supporting member 7, 9 is preferably arranged to avoid or reduce torsion of the supporting member 7, 9 in an impact situation.

Figure 3:
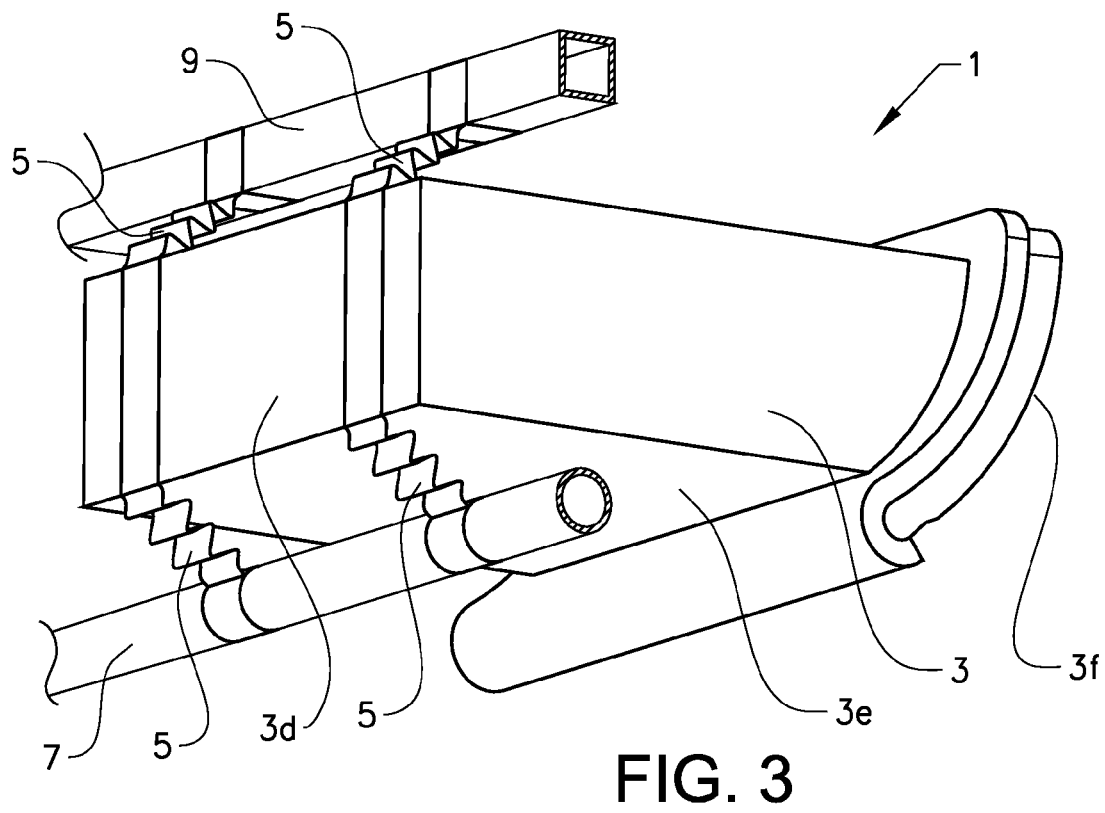
FIG. 3 shows, in a perspective view, the embodiment of the invention according to FIG. 2 seen from another direction.

FIG. 3 shows, in a perspective view, the embodiment of the invention according to FIG. 2 as seen from another direction, i.e. slightly from below and from the front 6a of the vehicle 6 towards the back of the vehicle 6. Consequently, FIG. 3 shows the backside 3d and the underside 3e of the glove box 3. FIG. 3 also shows that the steel bands 5 are tightly pressed against the backside 3d of the glove box 3.

Figure 4:
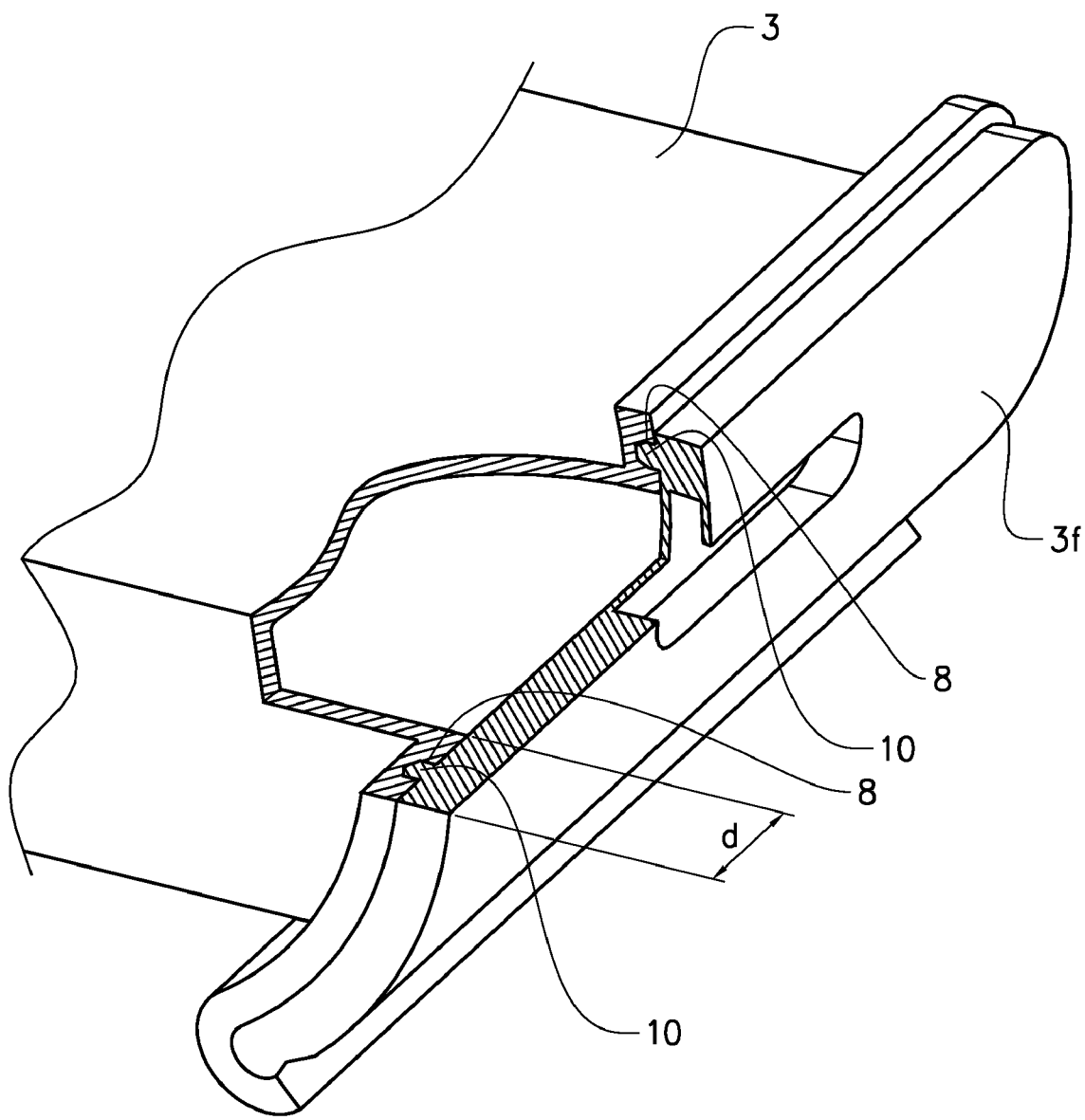
FIG. 4 shows a detail of the embodiment of the invention according to FIGS. 2 and 3.

FIG. 4 shows a detail of the fitting of the lid 3f to the frame of the glove box 3. The front side of the frame of the glove box 3 is provided with a groove 8 adapted to receive a rib 10 arranged on the inside of the lid 3f. This ensures that the lid 3f is securely connected to the frame of the glove box 3. Further, a wide contact surface between the lid 3f and the frame, indicated by the distance d, is formed in order to make the load distributing member 3 sufficiently rigid. In this example the width of the contact surface is 30 mm.

As shown in FIGS. 2 and 3, the steel band 5 is wave-shaped in its longitudinal direction. The effect of shaping the steel band 5 in this way is that the band 5 becomes extendable by deformation in its longitudinal direction when exposed to a tensile force directed at least partly in this direction. The direction, frequency, amplitude and shape of the waves may be varied and adapted to the particular application.

For instance, the band 5 may instead be wave-shaped in a transversal direction or the waves may exhibit sharp edges as to form a folded-like structure. By varying e.g. the dimensions and the wave-shape of the steel band 5, it is possible to design a load deformable member 5 that exhibits resilient properties up to a certain force level and that deforms in a plastic manner, i.e. it deforms in a permanent energy absorbing manner, when this level is exceeded.

Figure 5A:
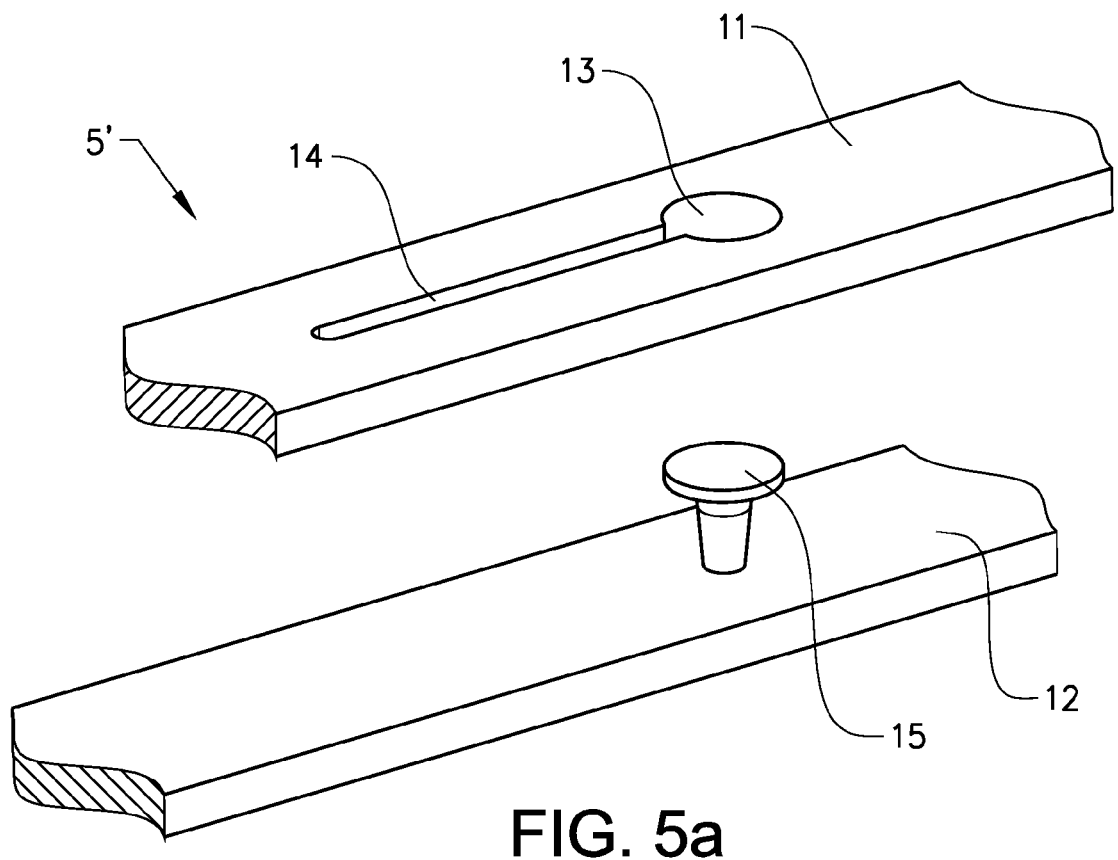
FIG. 5a shows a variant of one of the components of the invention in a non-assembled state.
Figure 5B:
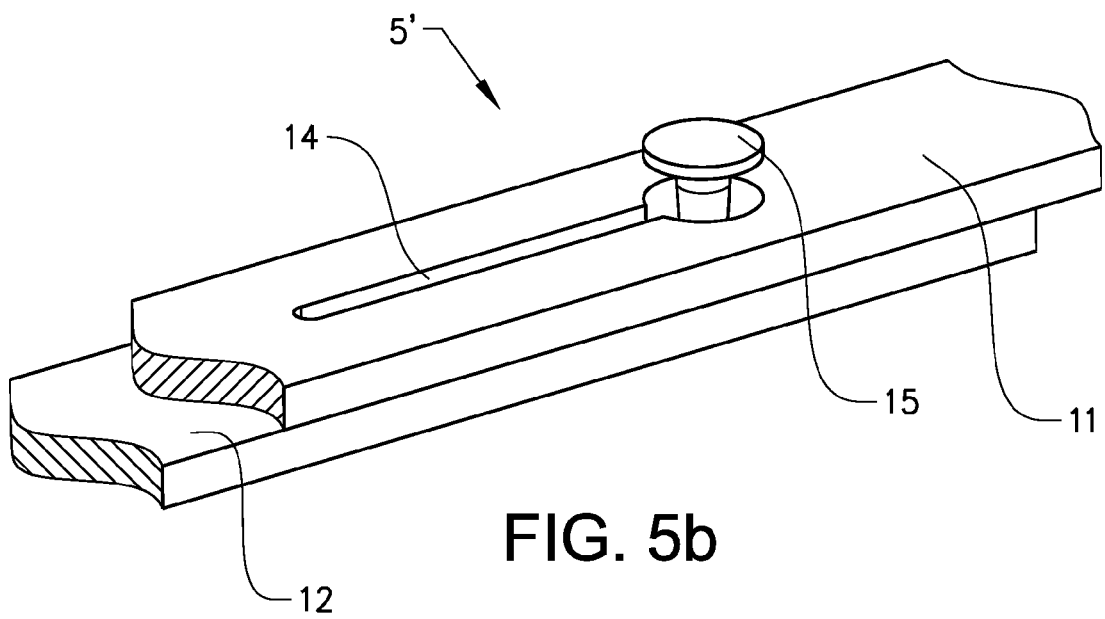
FIG. 5b shows the component according to FIG. 5a in an assembled state.

FIGS. 5*a* and 5*b* show another variant of the load deformable member 5'; FIG. 5*a* shows it in a non-assembled state, and FIG. 5*b* shows it in an assembled state. In this variant, the load deformable member 5' comprises a first part 11 attached to the supporting member 7, 9 and a second part 12 attached to the load distributing member 3. The first part 11 is provided with a through hole 13 and a guiding slot 14 arranged in the longitudinal direction of the first part 11. The slot 14 extends from said through hole 13, and has a width that is less than the diameter of the through hole 13.

Further, the slot is positioned on the side of the through hole 13 that is intended to face away from the supporting member 7, 9. The second part 12 is provided with a funnel-shaped pin 15 having its wider portion extending up from the surface of the second part 12 and being adapted to be received by the through hole 13. The two parts 11, 12 are joined together by inserting the pin 15 into the hole 13. The width of the slot 14 is smaller than the width/diameter of the pin 15 at any height of the pin 15. In similarity with the steel band shown in FIGS. 2 and 3, this variant is also extendable by deformation in its longitudinal direction when exposed to a tensile force directed at least partly in this direction. In this case, the pin 15 is forced along the slot 14 while deforming the first part 11.

In the event of a frontal, or at least partly frontal, impact with a vehicle, the vehicle itself will decrease its velocity before that of an occupant in the vehicle, with the result that the occupant will move towards the front of the vehicle. In a vehicle equipped with a safety device 1 according to the invention, the knees or legs of an occupant sitting in the seat 4 will thus hit the glove box lid 3*f*, i.e. they will hit the load distributing member 3. Generally, the maximum total knee load on the load distributing member 3 during impact is expected to be around 20 kN.

The main function of the load distributing member 3 is to distribute, i.e. transmit, the impact load to the load deformable member 5, 5'. An important structural property of the load distributing member 3 is therefore to be sufficiently rigid to carry out this function. The load is distributed to the load deformable member 5, 5' when the load distributing member 3, due to the impact load in an impact situation, moves in relation to the supporting member 7, 9. The main function of the load deformable member 5, 5' is to slow down the relative velocity of the load distributing member 3, and thus of the occupant's knees or other part of the body, during a certain time period, i.e. along a certain braking distance, such that the deceleration forces acting on the occupant do not become too large.

In the preferred embodiment of the invention shown in the figures, one end of the load deformable member 5, 5' is attached to a supporting member 7, 9, which can be regarded as a stationary member, and the other end of the load deformable member 5, 5' is attached to the load distributing member 3 at a position that is located further away from the seat 4, or closer to the front 6*a* of the vehicle 6, than the supporting member 7, 9. The effect of this is that tensile forces will arise in the load deformable member 5, 5' in the event of an impact, which tensile forces are used to let the load deformable member 5, 5' deform in such a way that the load distributing member 3 is retarded in a suitable way. To do this, the impact energy must, at least temporarily, be absorbed by the load deformable member 5, 5'. Part of this impact energy can be absorbed in an elastic, spring-like manner whereas part of the energy can be absorbed in an inelastic manner, i.e. plastic deformation.

Referring to the wave-shaped bands 5 shown in FIGS. 2-3, the impact energy is absorbed by extending the bands 5, i.e. by straightening out their wave-shape. Part of this straightening deformation could be elastic and part of it inelastic. As mentioned above, this can be controlled in the design of the bands 5.

Referring to the other variant of the load deformable member 5' shown in FIGS. 5*a* and 5*b*, the impact energy is absorbed by deformation, mainly plastic, when the funnel-shaped pin 15 is forced along the slot 14. The funnel-shape of the pin 15 prevents the pin 15 from moving downwards through the slot 14.

In an alternative embodiment of the variant of the load deformable member 5' shown in FIGS. 5*a* and 5*b*, the funnel-shaped pin 15 can be arranged directly in one or both of the supporting members 7, 9. Having this design, the pin 15 itself can be regarded as forming the second part 12. In such a structure the hole 13 and the slot 14 can be arranged either directly in the load distributing member 3, wherein a portion of the load distributing member 3 itself thus forms the first part 11, or in a further part attached to the load distributing member 3. In such a design, the load deformable member 5' can be arranged in level with the supporting member 7, 9, i.e. the load deformable member 5' is attached to the load distributing member 3 at a position that is located in level with the position at which the load deformable member 5' is attached to the supporting member 7, 9 as seen in a horizontal direction from the seat 4.

It may be noted that the main purpose of the safety device 1 as shown in the figures may not be to protect the knees or legs of an occupant. Instead, a main purpose of the safety device 1 may be to restrain the movement of the knees or legs of the occupant in an impact situation such that the whole interior safety system, i.e. safety belt, air-bag etc., works efficiently.

The invention is not limited by the embodiments described above but can be modified in various ways within the scope of the claims. For instance, it is not required that the load deformable member 5, 5' is attached directly to the load distributing member 3. As an example, a load deformable member 5, 5' extending at least slightly in a frontal direction from a supporting member 7, 9 could be connected to another, rigid part that extends in a direction towards the seat 4, i.e. towards the rear of the vehicle 6, which rigid part could be attached to the load distributing member 3 at a position that is closer to the seat 4, i.e. further away from the front 6*a* of the vehicle 6, than the supporting member 7, 9. In such a case the point of attachment between the load deformable member 5, 5' and the load distributing member 3 should be regarded as the connection between the load deformable member 5, 5' and the other, rigid part since it is the position of this point that is of importance for the function of the invention. A similar reasoning is also valid if the load deformable member 5, 5' and the other, rigid part are formed as one integral part.

One or several deformable members 5, 5' may be arranged in connection to the supporting member 7, 9 and the load distributing member 3. Further, an individual load deformable member 5, 5' may be arranged on only one side of the load distributing member 3, i.e. it does not necessarily have to extend between the two supporting members 7, 9. Moreover, the load deformable member(s) 5, 5' used may be arranged on only one side of the load distributing member 3. In such a case it may be needed to make use of a supporting system as to avoid rotation of the load distributing member 3 during impact. In the embodiment shown in FIGS. 2 and 3, i.e. with load deformable members 5 symmetrically arranged both above and below the load distributing member 3, rotation of the load distributing member 3 during impact is prevented.

In an alternative design, the load deformable members 5, 5' can be arranged at the two side walls 3b, 3c of the load distributing member 3 instead of above and below it. However, this will in most cases result in that the width of the glove box must be reduced.

Moreover, it is not necessary that the load deformable members 5, 5' are attached to the backside 3d of the load distributing member 3. This is, however, an advantageous solution when using band-like deformable members 5 with regard to simplicity, cost-effective production/assembly and saving of space.

As an alternative to the structure shown in FIGS. 5a and 5b, it is of course possible to instead provide the first part 11 with the pin 15 and the second part 12 with the hole 13 and the slot 14. Moreover, any of the two parts 11, 12 could be attached to the supporting member 7, 9 and the other to the load distributing member 3. Although a guiding slot 14 allows for a controlled movement of the pin 15, and thus a controlled deformation, it is also possible to dispense with the slot 14 if the deformation can be sufficiently controlled by other means, such as choice of material and dimensions. As an alternative to a funnel-shaped pin 15, the pin could be straight and be provided with a head.

In a further alternative the variants of load deformable members 5, 5' can be combined, for instance could the first and second parts 11, 12 be wave-shaped steel bands.

The advantageous effects of the invention can also be achieved with other types of load deformable members 5, 5' than what has been described above, such as pre-bent rods or structures that deform by tearing/rolling. The main feature of the load deformable member 5, 5' is to exhibit suitable force deformation characteristics. This can be achieved by different designs using different material, such as metal or plastics.

The inventive safety device 1 can also be applied in a position in front of the driver's seat, and also at the side or even above a seat. Irrespective of where the device 1 is positioned, it does not need to include a glove box although this is an advantage if positioned in front of the front-row passenger seat.

It may also be noted that the load distributing member 3 does not necessarily have to be exposed to a direct impact from a part of a body of a vehicle occupant in an impact situation. One or several components could be arranged to transmit the load from the knee/leg to the load distributing member 3.

What is claimed is:

1. A safety device for a vehicle said vehicle having a windshield, said device comprising:
    a load distributing member for arrangement in front of a vehicle seat so as to be exposed to an impact load from a vehicle occupant as the occupant moves forwardly in an impact situation; and
    a load deformable member arranged to retard the forward movement of the occupant, wherein the load deformable member is attached to the load distributing member and to a supporting member, which supporting member is intended to hold at least a part of the load deformable member in place in relation to the vehicle, wherein the load distributing member is sufficiently rigid to allow the impact load to be distributed to the load deformable member, wherein the load deformable member is attached to the load distributing member at a position that is located closer to a front of the vehicle than the position at which the load deformable member is attached to the supporting member.

2. The safety device according to claim 1, wherein the load distributing member is arranged to be movable when exposed to an impact load from a vehicle occupant.

3. The safety device according to claim 1 wherein the load deformable member comprises a wave-shaped steel band.

4. The safety device according to claim 1, wherein the load deformable member comprises a first part attached to the supporting member and a second part attached to the load distributing member, wherein said first and second parts are arranged to be joined together by inserting a pin, positioned on one of the parts, into a hole positioned on the other part.

5. The safety device according to claim 1, wherein the load distributing member comprises a part of a glove box.

6. A safety device for a vehicle, said device comprising:
    a glove box for arrangement in front of a vehicle seat so as to be exposed to an impact load from a vehicle occupant as the occupant moves forwardly in an impact situation; and
    a load deformable member arranged to retard the forward movement of the occupant, wherein the load deformable member is attached to the glove box and to a supporting member, which supporting member holds at least a part of the load deformable member in place in relation to the vehicle, wherein the glove box is sufficiently rigid to allow the impact load to be distributed to the load deformable member, wherein the load deformable member is attached to the glove box on a distal side of the glove box that faces away from the seat.

7. A safety device for a vehicle said vehicle having a windshield, said device comprising:
    a load distributing member for arrangement in front of a vehicle seat so as to be exposed to an impact load from a vehicle occupant as the occupant moves forwardly in an impact situation; and
    a load deformable member arranged to retard the forward movement of the occupant, wherein the load deformable member is attached to the load distributing member and to a supporting member, which supporting member holds at least a part of the load deformable member in place in relation to the vehicle, wherein the load distributing member is sufficiently rigid to allow the impact load to be distributed to the load deformable member, wherein the safety device is arranged between said supporting member and an additional supporting member wherein the load deformable member is arranged to be connected to both supporting members so as to extend from one of the supporting members to the other via the load distributing member.

8. The safety device according to claim 7, wherein the load deformable member extends from a first position above the load distributing member to a second position below the load distributing member when the device is installed.

* * * * *